US012000675B2

(12) United States Patent
Verheylewegen et al.

(10) Patent No.: US 12,000,675 B2
(45) Date of Patent: Jun. 4, 2024

(54) INTELLIGENT SYSTEM FOR CONTROLLING FUNCTIONS IN A COMBAT VEHICLE TURRET

(71) Applicant: JOHN COCKERILL DEFENSE SA, Loncin (BE)

(72) Inventors: Guillaume Verheylewegen, Saint-Germain (BE); Bernard Clermont, Romsee (BE)

(73) Assignee: JOHN COCKERILL DEFENSE SA, Loncin (BE)

( * ) Notice: Subject to any disclaimer, the term of this patent is extended or adjusted under 35 U.S.C. 154(b) by 174 days.

(21) Appl. No.: 17/784,213

(22) PCT Filed: Nov. 27, 2020

(86) PCT No.: PCT/EP2020/083724
§ 371 (c)(1),
(2) Date: Jun. 10, 2022

(87) PCT Pub. No.: WO2021/121909
PCT Pub. Date: Jun. 24, 2021

(65) Prior Publication Data
US 2023/0045581 A1    Feb. 9, 2023

(30) Foreign Application Priority Data

Dec. 17, 2019 (EP) ..................................... 19216845

(51) Int. Cl.
*F41G 3/22* (2006.01)
*F41G 3/16* (2006.01)
(Continued)

(52) U.S. Cl.
CPC ............. *F41G 3/225* (2013.01); *F41G 3/165* (2013.01); *F41G 5/24* (2013.01); *G02B 27/0093* (2013.01);
(Continued)

(58) Field of Classification Search
CPC ............. F41G 3/22; F41G 3/225; F41G 3/165
See application file for complete search history.

(56) References Cited

U.S. PATENT DOCUMENTS

| | | | | |
|---|---|---|---|---|
| 4,091,273 A | * | 5/1978 | Fuller | ..................... F41G 3/225 |
| | | | | 398/106 |
| 4,111,555 A | * | 9/1978 | Ellis | ..................... G02B 27/017 |
| | | | | 356/141.2 |

(Continued)

FOREIGN PATENT DOCUMENTS

WO    WO 2016/072927 A1    5/2016

*Primary Examiner* — Derrick R Morgan
(74) *Attorney, Agent, or Firm* — LEYDIG, VOIT & MAYER, LTD.

(57) ABSTRACT

A system for controlling turret functions of a land-based combat vehicle includes: a plurality of image detection sensors for recording sequences of images having an at least partial view of a 360° environment of the land-based combat vehicle; at least one virtual, augmented or mixed reality headset for wear by an operator, the headset presenting the at least partial view of the environment of the land-based combat vehicle on a display, the headset including a direction sensor for tracking an orientation of the headset imparted during a movement of a head of the operator and eye tracking means for tracking eye movements of the operator; a control unit including at least one computing unit for receiving as input and processing: images supplied by the plurality of image detection sensors; headset position and orientation data supplied by the direction sensor; eye position data supplied by the eye tracking means.

15 Claims, 3 Drawing Sheets

(51) Int. Cl.
*F41G 5/24* (2006.01)
*G02B 27/00* (2006.01)
*G06F 3/01* (2006.01)
*G06T 19/00* (2011.01)
*H04N 5/265* (2006.01)
*H04N 23/698* (2023.01)

(52) U.S. Cl.
CPC .............. *G06F 3/012* (2013.01); *G06F 3/013* (2013.01); *G06T 19/006* (2013.01); *H04N 5/265* (2013.01); *H04N 23/698* (2023.01)

(56) References Cited

U.S. PATENT DOCUMENTS

| | | | | |
|---|---|---|---|---|
| 4,146,196 A | * | 3/1979 | Schultz | F41G 7/30 244/3.1 |
| 4,884,137 A | * | 11/1989 | Hanson | G02B 27/023 398/106 |
| 5,838,262 A | * | 11/1998 | Kershner | F41G 9/002 340/961 |
| 7,180,476 B1 | * | 2/2007 | Guell | H04N 7/181 348/148 |
| 7,401,920 B1 | * | 7/2008 | Kranz | G02B 27/0093 382/117 |
| 8,678,282 B1 | * | 3/2014 | Black | G06F 3/012 235/407 |
| 9,217,866 B2 | * | 12/2015 | Scales | G02B 27/01 |
| 10,557,683 B1 | * | 2/2020 | Staffetti | F41G 3/165 |
| 10,642,038 B1 | * | 5/2020 | Schuyler | G02B 23/125 |
| 2002/0039073 A1 | * | 4/2002 | Ben-Ari | F41G 3/225 340/980 |
| 2009/0086015 A1 | * | 4/2009 | Larsen | F41G 3/165 348/148 |
| 2009/0087029 A1 | * | 4/2009 | Coleman | G06V 10/255 382/103 |
| 2009/0184889 A1 | * | 7/2009 | Kier | G02B 27/017 345/8 |
| 2020/0219314 A1 | * | 7/2020 | James | F41G 3/225 |
| 2020/0357179 A1 | * | 11/2020 | Michel | B64D 43/00 |
| 2023/0112609 A1 | * | 4/2023 | Sundquist | B60N 2/026 297/216.1 |

* cited by examiner

INTELLIGENT SYSTEM FOR CONTROLLING FUNCTIONS IN A COMBAT VEHICLE TURRET

CROSS-REFERENCE TO PRIOR APPLICATIONS

This application is a U.S. National Phase application under 35 U.S.C. § 371 of International Application No. PCT/EP2020/083724, filed on Nov. 27, 2020, and claims benefit to European Patent Application No. EP 19216845.8, filed on Dec. 17, 2019. The International Application was published in French on Jun. 24, 2021 as WO 2021/121909 A1 under PCT Article 21(2).

FIELD

The present invention relates to the field of weaponry, in particular to a smart system for controlling functions of a turret in a land-based combat vehicle, and to the land-based combat vehicle equipped with such a system.

BACKGROUND

It is known that an armored land-based vehicle turret typically comprises a sight system which implements a daytime channel and a nighttime (or thermal) channel available to the gunner and to the commander as well as a laser telemeter. Generally, the gunner and the commander each have an individual station available to them which is provided with a joystick, which makes it possible to give a directional command in azimuth and in elevation to the sight system, and therefore to modify the line of sight, as well as a control screen. The sight system of the commander is very similar to that of the gunner, except that it provides a more panoramic view.

The commands of the turret are therefore transmitted manually using a joystick, a handlebar or more generally a hand lever having a plurality of buttons and associated with a visual support on a display screen showing the outside environment as well as the sighting commands.

However, this known system does not always allow precise access to the various control buttons, in particular when the vehicle is rolling, which generates vibrations resulting in the buttons and screens moving constantly relative to the eyes and hands of the operators. Thus, the view of the screens is jerky and the hands must remain glued on the control handle. This problem affects not only the selection of targets, but also the manual transmission of the firing command.

In order to address this issue, document WO 2016/072927 A1 proposes a situation perception system in a land-based combat vehicle, comprising a plurality of image detection sensors configured to record sequences of images showing different partial views of the environment of the land-based combat vehicle and a plurality of client devices, such as integrated virtual/augmented reality elements in particular comprising display means and a direction sensor, where each of the latter is configured to display a view of the environment of the combat vehicle, depending on the user's wishes, on a display. The image detection sensors are configured to be connected in a network and to send the sequences of images over the network using a technique according to which each image sequence sent by a sensor can be received by a plurality of receivers, such as multicasting. The client devices are also configured to be connected to said network and to receive, via the latter, at least one sequence of images recorded by at least one image detection sensor. Furthermore, each client device is configured to itself generate the desired view by processing images from the sequence of images and to allow the display of the desired view.

In particular, the views of the environment shown on the display can be selected by an operator based on the measurement of the position of the user's head using the direction sensor or based on eye tracking means integrated into the headsets, owing to which said user indicates the desired view by looking in a determined direction. Thus, by controlling the position of the head or eyes of the operator, it is possible to select different images to be viewed in the headset, front images but also rear images, hemispherical or at 360° based on the number and the distribution of the sensors outside the vehicle.

The aforementioned document teaches how to address the aforementioned problem in part by facilitating a hands-free selection of the desired views using eye tracking, but says nothing in particular about the selection of the firing command means in a land-based combat vehicle affected by vibrations during driving.

A use of eye tracking technology is also known which is intended for people suffering from physical or cognitive disorders to allow them to control a computer, without using a keyboard or a mouse. Three ways of "clicking" using eye control exist: blinking the eyes, which has the drawback of temporarily losing the target from sight; time delay or staring into a specific zone for a predetermined length of time; and using a contactor, which occurs after validating the "target" with the gaze.

This technique was developed to control a computer. It is otherwise more sensitive, given the risk of error, to engage a target using a cannon or a missile launcher, and this technique therefore cannot be adapted as is to this purpose.

The Ukrainian company LimpidArmor has developed a hardware and software interface based on the MS HoloLens system, which is a headset provided with transparent lenses and integrated sensors for a mixed (virtual and augmented) reality experience, which makes it possible to project 3D images in the form of high-resolution holograms and which allows the user to interact physically through gestures with the 3D elements (virtual layer superimposed on the real layer). Eight stabilization camera modules are located outside the vehicle to offer a 360° view of the environment to the crew of the tank in streaming and in real time. The system also displays the telemetry of all of the combat subsystems, the task statuses, the targets, as well as other augmented reality data, based in particular on artificial intelligence algorithms. The system does not explicitly describe the coupling of this system with the control of the weapons of the vehicle and is therefore silent on the issue of improving the fluidity of the viewing and the precision of the firing command in a driving situation. Furthermore, parameters associated with the tracking of the movement of the arms and hands of the operator can serve as input data in the MS HoloLens system. In light of the level of vibrations encountered in a tank, tracking the movement of the arms and hands appears inappropriate, since it is imprecise.

Document U.S. Pat. No. 7,401,920 B1 discloses an eye tracking system which determines the line of sight of a user as a function of the relative position between the center of the pupil and a point of reference, the system comprising an image detector which captures an image of the eye, a pupil illuminating light source which illuminates the user's pupil, a reference light source which illuminates a different part of the user's face as point of reference and an image processor which analyzes the detected image of the eye in order to determine the line of sight.

Document US 2009/0087029 A1 discloses a technology of the 4D-GIS system deploying an algorithm based on the GIS used to determine the location of a moving target by recording the terrain image obtained from a moving target indication (MTI) sensor or a small unmanned aerial vehicle (UAV) camera with the digital card of the GIS. For the movement prediction, the status of the target is estimated using an extended Kalman filter (EKF). In order to improve the prediction of the trajectory of the moving target, a reasoning algorithm with fuzzy logic is used to estimate the destination of a moving target by synthesizing data from the GIS, statistics from the target, tactics and other information derived from past experience, such as the likely movement direction of targets in correlation with the nature of the terrain and the presumed mission.

SUMMARY

In an embodiment, the present invention provides a system for controlling turret functions of a land-based combat vehicle, comprising: a plurality of image detection sensors configured to record sequences of images having an at least partial view of a 360° environment of the land-based combat vehicle; at least one virtual, augmented or mixed reality headset configured for being worn by an operator, the headset being configured to present the at least partial view of the environment of the land-based combat vehicle on a display, the headset including a direction sensor configured to track an orientation of the headset imparted during a movement of a head of the operator and eye tracking means configured to track eye movements of the operator; a control unit comprising at least one computing unit and configured to receive as input and processing: images supplied by the plurality of image detection sensors; headset position and orientation data supplied by the direction sensor; eye position data supplied by the eye tracking means; wherein the control unit is configured to compute an augmented view at least based on the images and headset position and orientation data, the augmented view being displayed for the operator by the headset, wherein the control unit is configured to determine parameters of a target selected by the operator at least based on eye data, the control unit being configured to compute at least one firing parameter and the control unit being configured to transmit the at least one firing parameter to a turret weapon controller, wherein the control system comprises at least one firing request detector configured to supply a firing request signal by the operator, and wherein the at least one virtual reality headset comprises at least one additional image detection sensor configured to record sequences of images of the environment inside the land-based combat vehicle, the control system being configured to receive data associated with the images and to display the date in the augmented view upon request by an operator.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention addresses at least one of the drawbacks of the aforementioned state of the art.

In an embodiment, the present invention reduces the cognitive work of the operator and to improve the machine-operator interface.

In an embodiment, the present invention also allows a faster execution of operations that is less disrupted by outside conditions.

In an embodiment, the present invention allows a "legible," comfortable and fluid view of the commands and of the outside and inside environment of the armored vehicle combined with an optimized use of the eye of the operator providing an instantaneous reaction using the sequences strictly speaking of engagement and initiation of firing.

The present invention relates to a system for controlling functions in an armored vehicle turret using a smart headset allowing an offboard view of the environment and access to the operating and firing commands.

A first aspect of the invention relates to a system for controlling turret functions of a land-based combat vehicle, said control system comprising:

a plurality of image detection sensors configured to record sequences of images having an at least partial view of the 360° environment of the land-based combat vehicle;

at least one virtual, augmented or mixed reality headset suitable for being worn by an operator, said headset being configured to present said at least partial view of the environment of the land-based combat vehicle on a display, said headset including a direction sensor suitable for tracking the orientation of said headset imparted during a movement of the operator's head as well as eye tracking means suitable for tracking eye movements of said operator;

a control unit, comprising at least one computing unit and suitable for receiving as input and processing:
  images supplied by the image detection sensors;
  headset position and orientation data supplied by said direction sensor;
  eye position data supplied by the eye tracking means;
  the control unit being suitable for computing an augmented view at least based on said images and headset position and orientation data, said augmented view being displayed for the operator by means of said headset;
  said control unit further being suitable for determining parameters of a target selected by the operator at least based on eye data, said control unit being configured to compute at least one firing parameter and said control unit being suitable for transmitting the at least one firing parameter to a turret weapon controller;
  said control system including at least one firing request detector configured to supply a firing request signal by the operator.

The control system is characterized in that the at least one virtual reality headset comprises at least one additional image detection sensor for recording sequences of images of the environment inside the land-based combat vehicle, said control system being suitable for receiving data associated with said images and displaying it in the augmented view upon request by an operator.

According to advantageous embodiments of the invention, the system for controlling turret functions of a land-based combat vehicle comprises one or several of the following technical features, according to any possible combination:

said firing request detector comprises at least one joystick or free hand lever configured as touch-sensitive sensor;

said firing request detector comprises at least one voice recognition module suitable for supplying the firing request signal;

coordinates of a point of the gaze of an operator in the or each augmented view are determined based on eye tracking means and the system is configured such that a virtual object associated with said point is integrated into said view and is positioned according to said coordinates;

the system comprises means for determining parameters of at least one potential target based on images supplied by the image detection sensors, the control system being configured to cause a graphic object associated with the or each potential target to coincide, in the or each augmented view, with the coordinates of the or each potential target;

the target selected by an operator is identified or validated when the graphic object respectively associated with a potential target coincides with the virtual object associated with the gaze point of the operator, the parameters of the selected target being determined based on the parameters of the identified potential target;

the parameters of the selected target are determined based on coordinates of the gaze point of the operator, by time delay, that is to say when the gaze point of said operator becomes immobile during a predetermined duration;

the or each augmented view is computed based on a processing operation such as a merging of images supplied by the image detection sensors and/or by the additional image detection sensor, and by at least one control parameter of the configuration of said augmented view, preferably the at least one parameter including coordinates of the center of said view and/or the width of the field of said view;

the or each augmented view is a view selected at least in a list of views made up of a daytime or infrared exterior panoramic view of the environment of the land-based combat vehicle, a portion of said panoramic view, a region corresponding to a zoom or enlargement of the portion of said panoramic view, a partial view of the environment inside the land-based combat vehicle and any combination of the latter;

the or each augmented view is selected from the list of views based on at least one parameter for controlling the configuration of the augmented view, preferably said view including a virtual object for selecting said parameter, preferably a menu integrated into the augmented view;

the at least one parameter for controlling the configuration of the augmented view is determined based on coordinates of a gaze point of an operator in the augmented view;

the firing parameter comprises at least one of the following elements:

a datum corresponding to the azimuth and a datum corresponding to the elevation of said canon of the turret;

data corresponding to the GPS coordinates of the selected target;

the image detection sensors include at least one camera with 360° visibility and/or at least one rotating and/or pivoting optronic camera, high-definition with zoom;

the at least partial view of the environment of the land-based combat vehicle corresponds to the clear view that an operator would have without hindrance from at least one wall portion of the body and/or of the turret from a position connected to the body and/or to the turret of the land-based combat vehicle, said position preferably being inside the body.

Another aspect of the invention relates to a land-based combat vehicle including:

a system according to the invention, as described above;

an armored automobile body and a motorized turret both able to bear the image detection sensors;

a cannon and/or a missile launcher positioned on said turret;

a turret weapon controller positioned on the land-based combat vehicle configured to receive the at least one firing parameter from said system.

The measures of the invention are advantageous in that they make it possible to improve the machine-operator interface. They also allow faster operations. The use of a virtual or augmented or mixed reality headset can be suitable for further making it possible to better protect the eyes, the hearing system and the face of the operator and thus decreases the risk of serious injuries, which can increase its involvement. The use of a virtual or augmented or mixed reality headset also allows better management of the superposition of the inside and outside views.

In general, the advantageous embodiments of each object of the invention are also applicable to the other objects of the invention. To the extent possible, each object of the invention can be combined with the other objects. The objects of the invention can also be combined with the embodiments of the disclosure, which can also be combined with one another.

Figure 1:
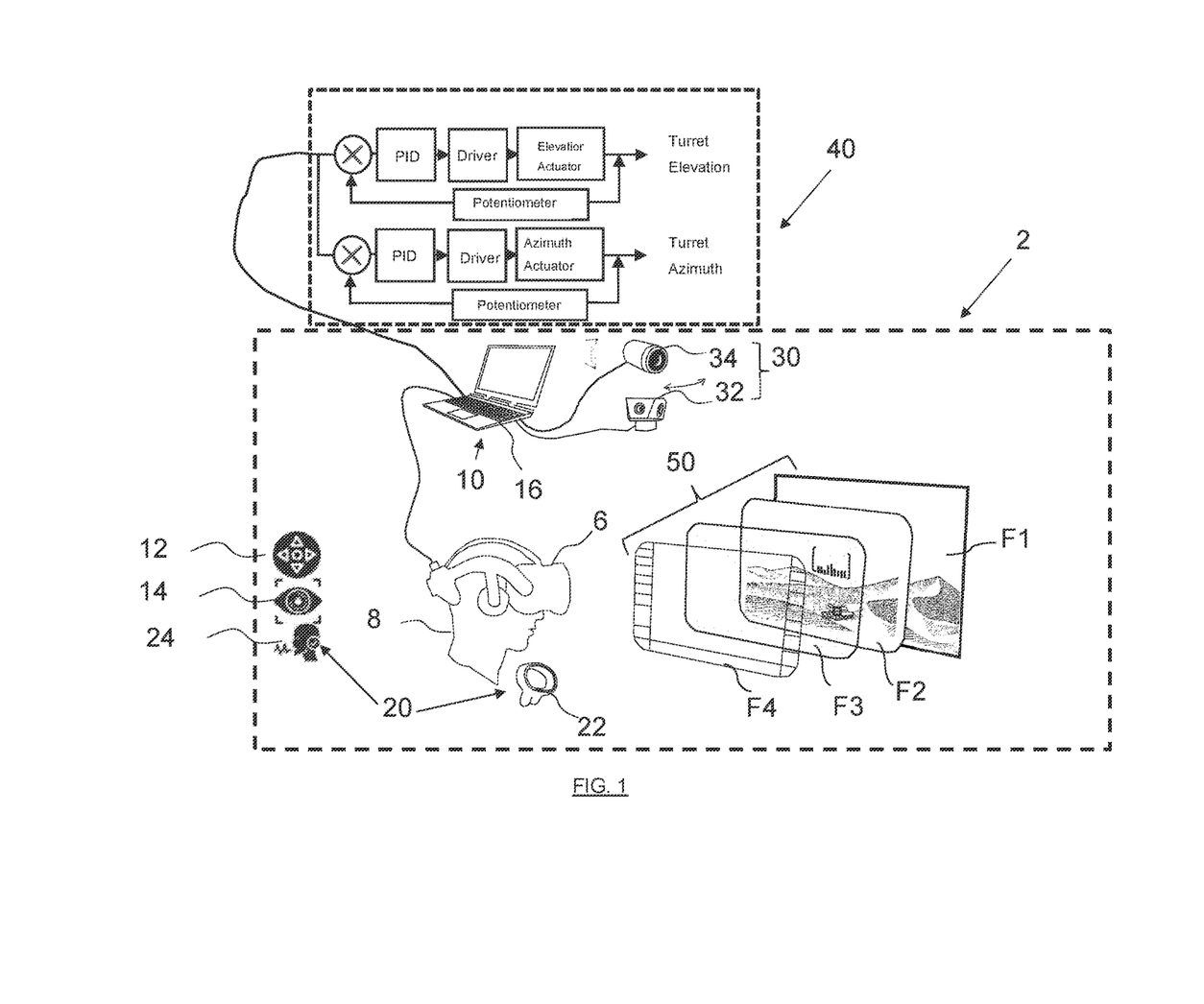
FIG. 1 schematically shows the system according to the invention in combination with a turret weapon controller.

FIG. 1 shows a schematic view of the system 2 for controlling functions in a land-based combat vehicle turret 4 according to the invention. The control system 2 includes a virtual, augmented or mixed reality headset 6 suitable for being worn by an operator 8 such as a gunner or a commander, and a control unit 10. The headset 6 can comprise a separate display screen or a transparent lens or a waveguide for each eye. The pupil distance can generally be adjusted manually using a thumb wheel, as can the distance between the eyes and the optics.

The virtual reality headset 6 is configured to have an at least partial view of the outside environment of the land-based combat vehicle 4, on a stereo display. Thus, the headset 6 further includes a motion or direction sensor 12, provided with one or more sensors of the gyroscope, accelerometer or laser position sensor type, suitable for using sensors to track how the operator 8 orients the headset 6 through the movement of his head. Additionally, the virtual reality headset 6 comprises eye tracking means 14 which are suitable for tracking the eye movements of the operator 8. Lastly, the headset 6 can advantageously comprise at least one additional image detection sensor, in particular one or two cameras integrated on the front face of the headset 6, allowing the operator 8 to view or control the environment inside the land-based combat vehicle without removing his headset 6.

The control unit 10 generally comprises hardware and software computer means (for implementing mathematical, image processing or machine learning algorithms), in particular a computing unit 16 such as a controller or a laptop computer as shown in FIG. 1, comprising a dedicated central computing unit and a storage memory such as a hard disk, and/or an in-situ or remote server. The control unit 10 receives, as input, data coming from various sensors such as:

- the firing request detector 20, in particular a touch-sensitive sensor mounted on a free hand lever 22 and/or a voice recognition module 24 configured to record a spoken firing order;
- the plurality of image sensors 30, for example a camera with 360° visibility 32, a high-definition rotating and/or pivoting optronic camera with zoom 34, etc.;
- the eye tracking means/sensors 14, comprising one or more near IR diodes and high-resolution cameras and algorithms;
- the direction sensor unit 12 of the virtual reality headset 6, comprising an accelerometer, a gyroscope and/or a laser position sensor.

These data are then processed by the control unit 10, which provides, as output, the parameters of a selected target such as sighting data corresponding to the azimuth and the elevation to be communicated to the canon of the turret for the selected target. The use of a free hand lever 22 (that is to say, with no mechanical attachment) or of a voice recognition module 24 has the advantage that the operator is not required to keep one hand in contact with the control station when the land-based contact vehicle is subject to driving vibrations.

The free (or wireless) hand lever 22 can comprise at least one gyroscope, accelerometer and/or laser position sensor.

"Touch-sensitive sensor" refers to any means capable of supplying a signal (electrical) in response to an intervention by the operator 8 in the form of pressure from the hand or finger, preferably a man/machine interface via a command from the finger(s) of the operator 8. This sensor can for example be a button, a capacitive sensor or a touchscreen.

The system 2 according to the invention has the advantage of being modular. Indeed, the control unit 10 can be adaptable to different types of land-based combat vehicle. To this end, the control unit 10 can be configured with the data of the vehicle. This approach favors the streamlining of costs and facilitates maintenance.

The turret weapon controller 40 can control a cannon and/or a missile launcher mounted on the turret. The actuators of the weapon controller 40 are not limited to electrical commands as illustrated by way of example in FIG. 1, but can comprise hydraulic actuators. Furthermore, a turret weapon controller 40 typically commands not only the means for orienting firing by the turret, but also the loading of the cannon.

The parameters of the selected target can also be the GPS coordinates, either in addition to the azimuth and elevation coordinates, or as an alternative.

The image detection sensors 30 include at least one camera with 360° visibility 32 and/or at least one rotating and/or pivoting optronic camera, high-definition with zoom 34. Preferably, the image detection sensors 30 are positioned on the turret of the land-based combat vehicle 4. The embodiments are not limited to a single 360° camera 32 and/or a single rotating and/or pivoting high-definition camera with zoom 34, but can of course comprise several 360° cameras 32 and/or several rotating and/or pivoting high-definition cameras with zoom 34, so as to cover any 360° environment with a sufficient resolution. The reduction of the image detection means also allows better tracking of the targets by the operator(s) 8. In one particular configuration, a rotating and/or pivoting high-definition camera with zoom 34 can be provided for each operator 8, allowing targets to be selected independently.

Figure 2:
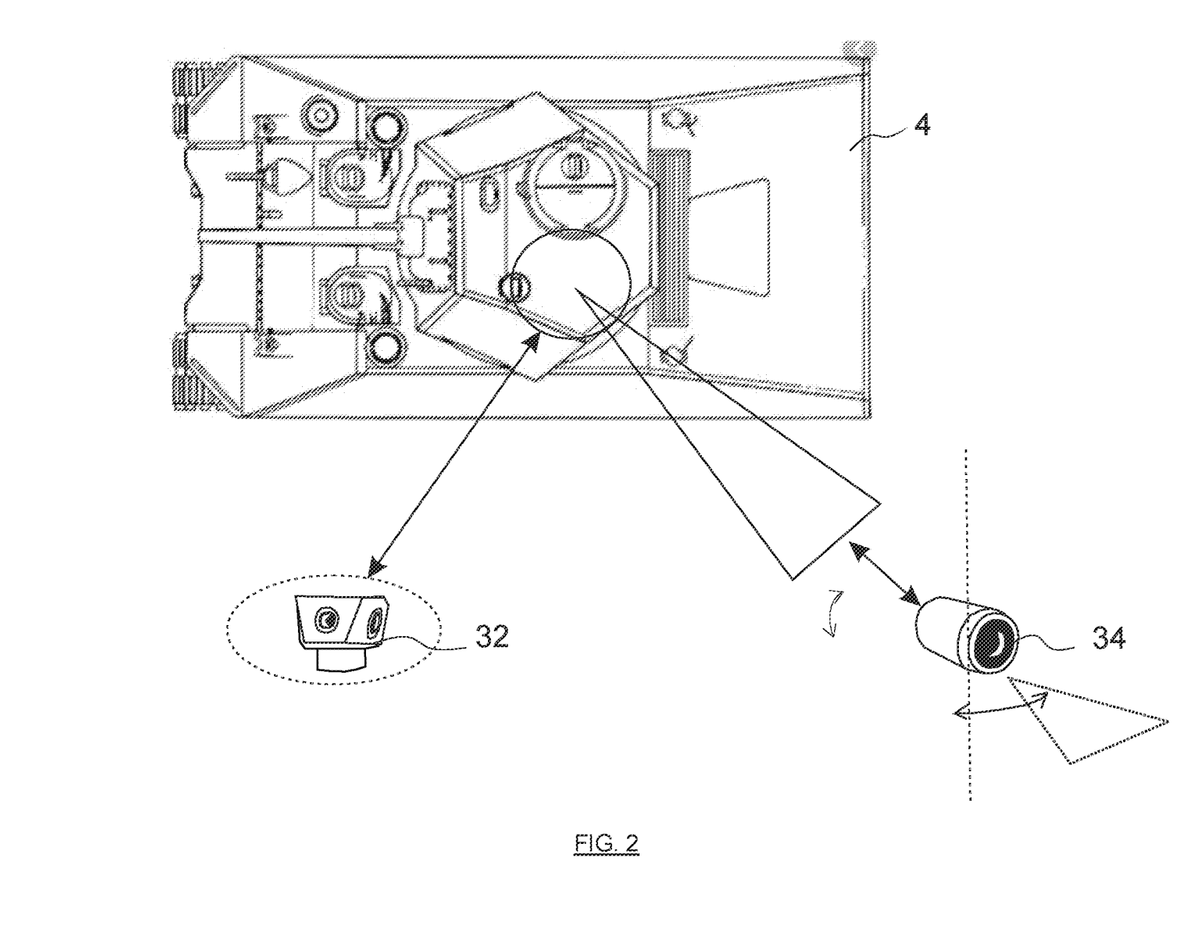
FIG. 2 illustrates examples of image detection means according to the invention.

FIG. 2 shows a particular embodiment of the invention in which the land-based combat vehicle 4 comprises a 360° camera 32 and a rotating and/or pivoting high-definition camera with zoom 34. According to one embodiment, the rotation and the pivoting of the high-definition camera can advantageously be slaved to the direction sensor 12 of the headset 6.

Figure 3:
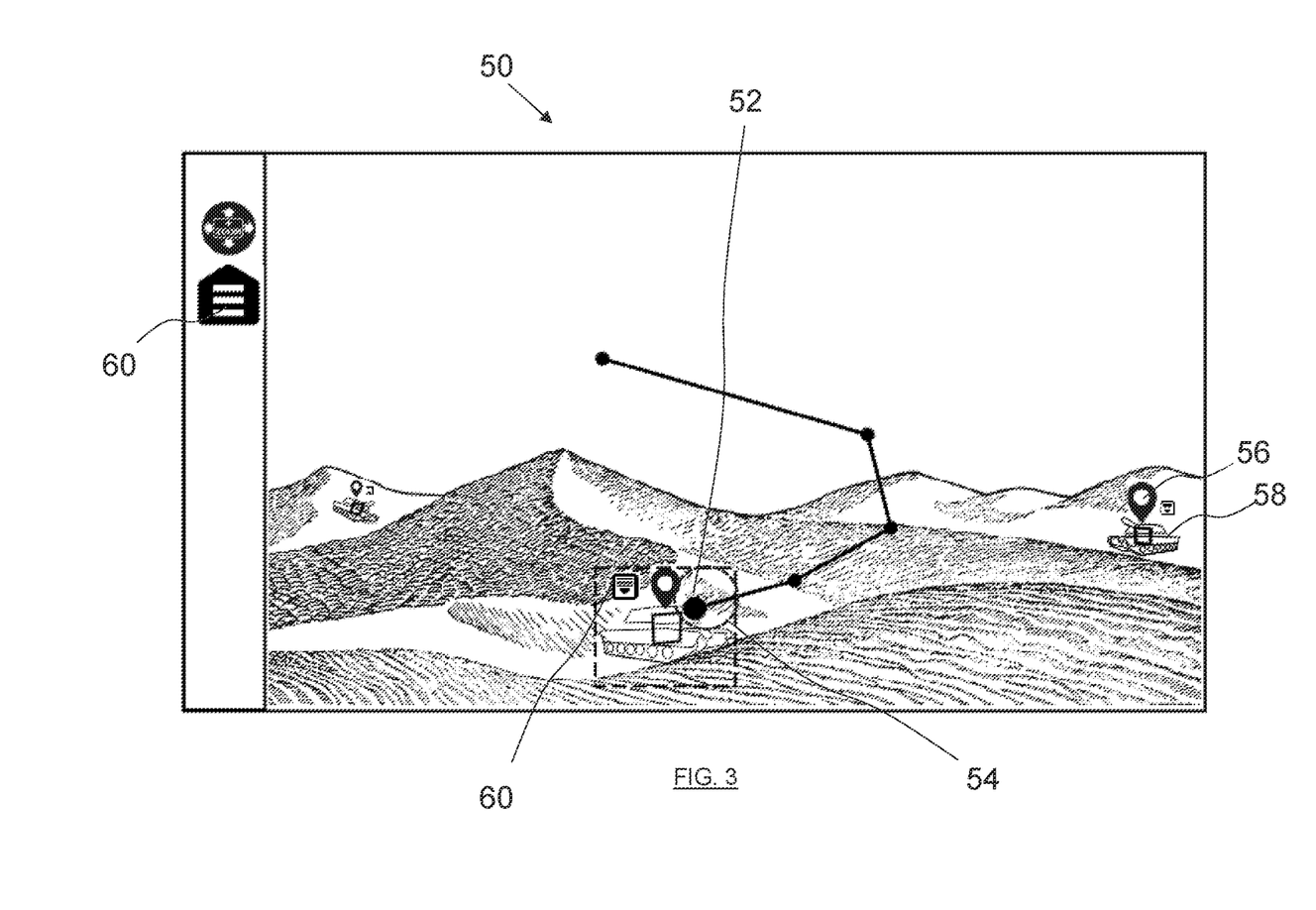
FIG. 3 shows a schematic example of an augmented view according to the invention.

FIG. 3 illustrates an example of augmented view 50 of the outside environment of the land-based combat vehicle 4 that an operator 8 perceives in the headset 6. The operator 8 can also choose the view 50 to be projected among several views, for example a daytime or infrared (nighttime) outside panoramic view of the environment of the land-based combat vehicle, a zoom of the portion of said panoramic view, a partial view of the environment inside the land-based combat vehicle 4, or any combination of the latter.

Preferably, a stereoscopic or non-stereoscopic augmented view 50 is displayed in the headset 6. This augmented view 50 may comprise several layers, for example the real or optical view (F1), an optronic view with nonvisible radiation, e.g., IR with image processing (F2), an augmented data view (F3) and a graphic view of the turret control parameters (F4). In general, the headset 6 has a view computed for each eye of the operator 8. This view 50 can also comprise one or several virtual objects 52 associated with the point of the gaze 54 of at least one of the operators 8, as well as one or several graphic objects 56 associated with the or each potential target 58. Furthermore, one or several menus 60 can be integrated into the or each augmented view 50. Owing to the menus 60, the operator can, on request, view different modes relative to the outside, turret command, target, firing command views. These modes are "stackable" on the view.

The potential targets 58 can be determined or selected by computer processing based on the analysis of the images according to object recognition algorithms. The determination of these potential targets 58 can be done by the control unit 10 according to the invention from a database which comprises the parameters of a series of usual targets, for example modeled or stylized forms of enemy combat vehicles, in particular by machine learning. This database can be downloaded, making it possible to adapt the artificial intelligence means to the terrain. The control unit 10 can also interact with and obtain data coming from other outside or off-board information means, such as drones, airplanes or satellites.

If the operator 8 identifies a potential target 58 which has not yet been identified by the object recognition means, he has the possibility of engaging it for example when his gaze point stabilizes on the latter and a predetermined engagement request is made.

In a configuration with two operators 8, a potential target 58 can be identified by one of the operators 8 and the firing request can be made by the other operator 8.

The land-based combat vehicle 4 is for example a tank or a wheeled all-terrain infantry armored combat vehicle.

The headset 8 can advantageously comprise reinforcing means on the front face and/or on the side faces, such as one or several plates (made from Kevlar or the like) in order to protect the eyes and/or the hearing system of the operator, according to the military standards in force. This robustness and safety aspect is not addressed at all in the virtual reality headsets that are currently on the market, which are primarily intended for gaming applications, and thus constitutes another innovative aspect of the present invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCES 2 system for controlling turret functions
4 land-based combat vehicle
6 virtual reality headset
8 operator
10 control unit
12 direction sensor
14 eye tracking means
16 computing unit
20 firing request detector
22 free hand lever
24 voice recognition module
30 image detection sensor
32 camera with 360° visibility
34 high-definition rotating and/or pivoting optronic camera with zoom
40 turret weapon controller
50 augmented view
52 virtual object(s)
54 gaze point
56 graphic object(s)
58 potential target(s)
60 menu

The invention claimed is:

1. A system for controlling turret functions of a land-based combat vehicle, comprising:
a plurality of image detection sensors configured to record sequences of images having an at least partial view of a 360° environment of the land-based combat vehicle (4);
at least one virtual, augmented or mixed reality headset configured for being worn by an operator, the headset being configured to present the at least partial view of the environment of the land-based combat vehicle on a display, the headset including a direction sensor configured to track an orientation of the headset imparted during a movement of a head of the operator and eye tracking means configured to track eye movements of the operator;
a control unit, comprising at least one computing unit and configured to receive as input and process:
images supplied by the plurality of image detection sensors;
headset position and orientation data supplied by the direction sensor;
eye position data supplied by the eye tracking means;
wherein the control unit is configured to compute an augmented view at least based on the images and headset position and orientation data, the augmented view being displayed for the operator by the headset;
wherein the control unit is configured to determine parameters of a target selected by the operator—at least based on eye data, the control unit being configured to compute at least one firing parameter and the control unit being configured to transmit the at least one firing parameter to a turret weapon controller;
wherein the control system comprises at least one firing request detector configured to supply a firing request signal by the operator, and
wherein the at least one virtual reality headset comprises at least one additional image detection sensor configured to record sequences of images of the environment inside the land-based combat vehicle, the control system being configured to receive data associated with the images of the inside environment and to display the data in the augmented view upon request by an operator.

2. The control system of claim 1, wherein the firing request detector comprises at least one joystick or free hand lever comprising a touch-sensitive sensor.

3. The control system of claim 1, wherein the firing request detector comprises at least one voice recognition module configured to supply the firing request signal.

4. The control system of claim 1, wherein coordinates of a point of a gaze of an operator in the augmented view are determined based on eye tracking means, and
wherein the control system is configured such that a virtual object associated with the point of gaze is integrated into the augmented view and is positioned according to the coordinates.

5. The control system of claim 1, further comprising means for determining parameters of at least one potential target based on images supplied by the plurality of image detection sensors, the control system being configured to cause a graphic object associated with the at least one potential target to coincide, in the augmented view, with the coordinates of the at least one potential target.

6. The control system of claim 5, wherein the target selected by the operator is identified or validated when the graphic object respectively associated with a potential target coincides with the virtual object associated with a gaze point of the operator, the parameters of the selected target being determined based on the parameters of the identified potential target.

7. The control system of claim 6, wherein the parameters of the selected target are determined based on coordinates of the gaze point of the operator, by time delay, when the gaze point of the operator becomes immobile during a predetermined duration.

8. The control system of claim 1, wherein the augmented view is computed based on a processing operation comprising a merging of images supplied by at least one of the plurality of image detection sensors or by the additional image detection sensor, and by at least one control parameter of the configuration of the augmented view, preferably the at least one parameter including at least one of coordinates of the center of the view or the width of the field of the view.

9. The control system of claim 6, wherein the augmented view comprises a view selected from a list of views made up of at least one of a daytime or infrared exterior panoramic view of the environment of the land-based combat vehicle, or a portion of the panoramic view, or a region corresponding to a zoom or enlargement of the portion of the panoramic view, or a partial view of the environment inside the land-based combat vehicle.

10. The control system of claim 9, wherein the augmented view is selected from the list of views based on at least one parameter for controlling the configuration of the augmented view, preferably the view including a virtual object for selecting the parameter, preferably a menu integrated into the augmented view.

11. The control system of claim 10, wherein the at least one parameter for controlling the configuration of the augmented view is determined based on coordinates of the gaze point of an operator in the augmented view.

12. The control system of claim 1, wherein the firing parameter comprises at least one of the following elements:

a datum corresponding to an azimuth and a datum corresponding to an elevation of the canon of the turret;

data corresponding to GPS coordinates of the selected target.

13. The control system of claim 1, wherein the plurality image detection sensors include at least one of at least one camera with 360° visibility or at least one rotating optronic camera, high-definition with zoom or pivoting optronic camera, high-definition with zoom.

14. The control system of claim 1, wherein the at least partial view of the environment of the land-based combat vehicle corresponds to a clear view that an operator would have without hindrance from at least one of at least one wall portion of a body or of the turret of the vehicle from a position connected to the body or to the turret, the position preferably being inside the body.

15. A land-based combat vehicle, comprising:

the control system of claim 1;

an armored automobile body and a motorized turret both configured to bear the image detection sensors;

at least one of a cannon or a missile launcher positioned on the turret; and a turret weapon controller positioned on the land-based combat vehicle and configured to receive the at least one firing parameter from the control system.

* * * * *